United States Patent
Petty et al.

(10) Patent No.: US 6,323,277 B1
(45) Date of Patent: Nov. 27, 2001

(54) BRIDGED SILICONE OLIGOMERS AND CURABLE COMPOSITIONS CONTAINING SAME

(75) Inventors: Herbert E. Petty, Bethel, CT (US); Robert Pickwell, Tonawanda, NY (US)

(73) Assignee: Witco Corporation, Greenwich, CT (US)

( * ) Notice: Subject to any disclaimer, the term of this patent is extended or adjusted under 35 U.S.C. 154(b) by 0 days.

(21) Appl. No.: 09/266,500

(22) Filed: Mar. 11, 1999

Related U.S. Application Data

(63) Continuation-in-part of application No. PCT/US98/17391, filed on Aug. 21, 1998, which is a continuation-in-part of application No. 09/062,047, filed on Apr. 17, 1998, now Pat. No. 6,140,445.

(51) Int. Cl.$^7$ ............................ C08L 83/06; C08L 83/08; C08L 83/10; C07F 7/02; C08G 77/04
(52) U.S. Cl. ...................... 524/865; 524/858; 524/860; 524/861; 524/862; 524/863; 524/866; 556/450; 528/15; 528/18; 528/24; 528/31; 528/32; 528/33; 528/35; 525/100; 525/101; 525/102; 525/103; 525/105; 525/106
(58) Field of Search .............................. 528/15, 18, 24, 528/31, 32, 33, 35; 525/100, 101, 102, 103, 105, 106; 524/858, 860, 861, 862, 863, 865, 866; 556/450

(56) References Cited

U.S. PATENT DOCUMENTS

| | | |
|---|---|---|
| 2,878,195 | 3/1959 | Hurd ........................ 260/4 |
| 3,148,169 | 9/1964 | Martens .................. 260/41 |
| 3,284,406 | 11/1966 | Nelson .................. 260/46.5 |
| 3,423,236 * | 1/1969 | Quaal . |
| 3,440,214 * | 4/1969 | Quaal . |
| 3,455,878 * | 7/1969 | Quaal . |
| 3,692,812 | 9/1972 | Berger ................. 260/448.2 |
| 3,816,235 | 6/1974 | Lin ......................... 161/175 |
| 3,922,436 | 11/1975 | Bell et al. .............. 428/375 |
| 3,944,707 | 3/1976 | Foley et al. ........... 428/391 |
| 3,993,837 | 11/1976 | Foley et al. ........... 428/391 |
| 4,049,865 | 9/1977 | Maaghul ............... 428/391 |
| 4,060,539 | 11/1977 | Seiler et al. ........ 260/448.8 |
| 4,130,677 | 12/1978 | Huntsberger ......... 427/379 |
| 4,179,537 | 12/1979 | Rykowski ............. 427/387 |
| 4,550,056 | 10/1985 | Pickwell et al. ...... 428/391 |
| 4,737,562 | 4/1988 | Chaudhury et al. .... 528/15 |
| 4,753,976 | 6/1988 | Yoshioka et al. .... 524/575.5 |
| 4,950,779 | 8/1990 | Wengrovius et al. ... 556/457 |
| 5,210,168 | 5/1993 | Bergstrom et al. ...... 528/12 |
| 5,282,998 | 2/1994 | Horn et al. ........ 252/182.14 |
| 5,298,998 | 3/1994 | Furumiya et al. ...... 348/537 |
| 5,982,041 * | 11/1999 | Mitani et al. .......... 257/783 |

FOREIGN PATENT DOCUMENTS

| | | |
|---|---|---|
| 38 13678 | 11/1988 | (DE) . |
| 0 124 805 | 11/1984 | (EP) . |
| 0 499233 A2 | 2/1992 | (EP) . |
| 0 784 072 | 1/1997 | (EP) . |
| 0 801 112 A2 | 10/1997 | (EP) . |
| 0 890 598 A1 | 1/1999 | (EP) . |
| 96/16125 | 5/1996 | (WO) . |
| 97/25374 | 7/1997 | (WO) . |
| 99/02580 | 2/1999 | (WO) . |

OTHER PUBLICATIONS

Chem. Abst. III: 79474 (1989) Abstracting JP 63–248821.

M. G. Voronkov et al, Trialkoxysilylakanethiols and Bix (Trialkoxysilylalkyl) Sulfides, translated from Izvestiya Akademii Nauk SSR, Seriya Khimicheskaya, No. 8, pp. 1849–1851, Aug. 1977.

G. A. Gornowicz et al, "Preparation of Silylalkanethiols", J. Org. Chem., 33 (1968) pp. 2918–2924.

Product Brochure, "Silquest Silanes", Witco Corporation (8 pgs), 1998.

* cited by examiner

Primary Examiner—Robert Dawson
Assistant Examiner—Jeffrey B. Robertson
(74) Attorney, Agent, or Firm—Michael Dilworth

(57) ABSTRACT

Oligomers of the formula:

$$[R_3SiO_{1/2}]_m[O_{1/2}Si(R_2)O_{1/2}]_n[SiO_{3/2}R]_o[SiO_{4/2}]_p \quad (I)$$

wherein
each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by an Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano and oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10, are useful as coupling agents in curable compositions of filled organic polymers used for wire and cable insulation. The oligomers also have utility as crosslinkers, as adhesion promoters, to provide a dual radical/moisture cure mechanism, and/or to provide moisture resistance in coating, in other compositions, such as curable adhesives and coatings.

20 Claims, No Drawings

US 6,323,277 B1

BRIDGED SILICONE OLIGOMERS AND CURABLE COMPOSITIONS CONTAINING SAME

CROSS REFERENCE TO RELATED APPLICATIONS

This application is a continuation-in-part of copending U.S. patent application Ser. No. 09/062,047, filed Apr. 17, 1998 now U.S. Pat. No. 6,140,445 and a continuation-in-part of PCT\US98\17391, filed Aug. 21, 1998, designating US, both of which are incorporated herein by reference.

BACKGROUND OF THE INVENTION

1. Field of the Invention

This invention relates to silicone oligomers useful as coupling agents for curable compositions, for instance free-radically curable filler-organic elastomeric polymer compositions having special application as insulation coatings, to compositions employing the oligomers, and to cured products obtained therefrom.

2. Description of the Prior Art

A substantial amount of research has been performed heretofore in connection with the treatment of fillers or reinforcing agents for the purpose of improving physical or mechanical properties of plastics, resins or rubbers reinforced with the filler. Much of this research has centered on the pretreatment of glass fiber reinforcement materials for resins and rubbers. For example, U.S. Pat. No. 3,702,783 describes the application as a size to glass fibers of a blend of 3-glycidoxypropyltrirethoxysilane and methyltrimethoxysilane. U.S. Pat. No. 3,816,235 discloses a size composition for the treatment of glass fibers wherein the size composition contains a blend of aminoalkyltriethoxysilane and methyltriethoxysilane. U.S. Pat. No. 3,944,707 discloses the use as a size for glass fiber reinforcement for plastics, blends of vinyl silane or vinyl siloxanes and a beta-haloalkoxysilane. Similarly, U.S. Pat. No. 3,993,837 discloses glass fiber size compositions containing blends of epoxyalkylsilane or siloxane and a beta-haloalkoxysilane.

U.S. Pat. No. 4,049,865 discloses glass fiber size compositions containing a blend of an aminoalkylsilane and a vinyl silane. U.S. Pat. No. 4,130,677 discloses the sizing of glass bottle surfaces with am aminoalkylsilane. None of these patents disclose or remotely suggest the use of blends of an ethylenicaly unsaturated silane having at least 1 silicon bonded hydroxy or alkoxy group and an organosiloxane oligomer having at least one silicon bonded hydroxy or alkoxy group reactive with the inorganic substrate as an integral coupling composition for improving mechanical and electrical properties by mixing with an organic elastomer, a filler and peroxide followed by curing.

Martens et al, U.S. Pat. No. 3,148,169, discloses the pretreatment of clay filler with a silicone fluid to coat the clay particles to impart a hydrophobic character to the clay and to mask the acidic nature of the clay so that peroxides later used as crosslinking agents are not deactivated.

Pickwell et al, U.S. Pat. No. 4,550,056, describes electrical cables comprising a conductor and a coating of insulation on the conductor, the coating comprising a cured composition of (1) an organic elastomer;
(2) an inorganic filler;
(3) a coupling composition comprising (a) an ethylenically unsaturated silane, having bonded to silicon, at least one hydroxy group and/or alkoxy group; (b) a methyl ethoxy siloxane oligomer fluid; and (c) a methyl vinyl siloxane oligomer fluid.

Rykowski, U.S. Pat. No. 4,179,537, discloses blends of an organofunctional silane, e.g., vinyltrialkoxysilanes, methacryloxyalkyltrialkoxysilanes, vinyltrihalosilanes and the like with a non-organofunctional silane, e.g., alkyltrialkoxysilanes, and the incorporation of such blends into organic resins, e.g., EPDM rubber for improving the adhesion between inorganic substrates such as clay fillers and the resin. This patent fails to disclose, teach or suggest the incorporation of siloxane oligomers in the coupling composition and suggests that the presence of siloxane oligomers in the resin-filler system could have a detrimental effect on coupling efficiency (col. 4, lines 54–63).

Use of silanes having silicon-bonded 2-methoxyethoxy groups as coupling agents, e.g., vinyl-tris-(2-methoxyethoxy)silane (col. 2, lines 44–47) is also described in U.S. Pat. No. 4,179,537. Vinyl-tris-(2-methoxyethoxy) silane, has been used industrially for many years as a coupling additive in mineral-filled EPM and EPDM wire and cable insulations. EPM is an ASTM designation for copolymers or ethylene and propylene; EPDM is a terpolymer of ethylene, propylene and a diene monomer such as ethylidene norbornene or 1,4 hexadiene. Vinyl-tris-(2-methoxyethoxy)silane has been extensively used heretofore because it provides a unique balance of elastomer reinforcement and the degree of wet electrical stability required. However, it releases 2-methoxyethanol as a hydrolysis by-product when it is used and, unfortunately, 2-methoxyethanol is now being studied as a suspected teratogen. Consequently coupling agent products based on vinyl-tris-(2-methoxyethoxy)silane are now facing continuing replacement pressure in the marketplace.

Commercial products used as coupling agents in elastomer/filler compositions include cohydrolysis products of dimethyl and vinylmethylchlorosilanes which are used as a filler hydrophobe treatment on calcined clays. Such products however, have a relatively high cost due to the high cost of vinylmethyldichlorosilane. Reducing the vinylmethyldichlorosilane content thereof gives inferior performance in wire cable insulation applications.

U.S. Pat. No. 4,950,779, Wengrovius, et al. (General Electric), describes mixtures comprising cyclic, linear and branched alkoxy functional silicone oligomers produced by condensation of organotrialkoxysilanes, such as methyltrimethoxysilane and vinyltrimethoxysilane, using formic acid, optionally with a strong acid catalyst.

U.S. Pat. No. 5,298,998, Horn, et al. (Hüls), describes mixtures of linear and cyclic alkoxy functional silicone oligomers produced from vinyltrialkoxysilanes using hydrogen chloride catalyst and water.

U.S. Pat. No. 5,210,168, Bergstrom, et al. (Dow Corning), describes alkoxy functional silicone oligomer mixtures produced from organotrialkoxysilanes using a carboxylic acid, such as formic acid, and a strong acid catalyst.

In copending U.S. patent application Ser. No. 09/062,047, filed Apr. 17, 1998, incorporated herein by reference, there are described novel alkoxy functional silicone oligomers having alkoxysilylalkyl substituents on a backbone silicon atom. Such oligomers may be produced, from vinylalkoxysiloxane oligomers by hydrosilation with an alkoxyhydridosilane; by hydrosilating a vinylalkoxysilane with a hydridoalkoxy silicone oligomer; or by condensation of a bis-alkoxysilane having silicon atoms joined by other than an Si—O bond, optionally with other alkoxysilanes. Such oligomers are disclosed to be useful as coatings or adhesive, or additives therefore.

SUMMARY OF THE INVENTION

It has now been discovered that silicone oligomers similar to those disclosed in U.S. patent application Ser. No. 09/062,047, and characterized by having vinyl or other aliphaticaly unsaturated hydrocarbon functionalities thereon, are useful in certain crosslinkable organic polymer/filler compositions such as wire cable insulating formulations, as well as other free-radically curable compositions. The silicone oligomers useful in the present invention may be of the formula

$$[R_3SiO_{1/2}]_m[O_{1/2}Si(R_2)O_{1/2}]_n[SiO_{3/2}R]_o[SiO_{4/2}]_p \qquad (I)$$

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by an Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano and oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10.

Accordingly, in one aspect, the invention is a curable composition comprising an oligomer of formula (I). Such compositions may be formed by mixing concurrently or in any order of succession:

(1) an organic polymer curable by a free radical mechanism;

(2) an inorganic filler;

(3) a siloxane oligomer as described above.

Preferred compositions also include a free radical catalyst system capable of crosslinking the organic polymer. Coating and adhesive compositions which comprise the oligomers of formula (I) may also be prepared.

The siloxane oligomers may be produced with little or no volatiles. They function as suitable, cost effective, replacements for commercial coupling agents used in wire cable insulator formulations, with decreased health hazards.

A further aspect the invention is an article, at least a portion of which comprises a cured composition as described above. Preferred articles are wire cables comprising a conductor and a coating of insulation on the conductor, the coating comprising the cured composition as described above.

Novel siloxane oligomers disclosed herein constitute a still further aspect of the invention.

DETAILED DESCRIPTION OF THE INVENTION

All patents or other published documents mentioned anywhere herein are expressly incorporated herein by reference in their entirety.

Oligomer Structure

In structure I above, B is an organosilyl functional group, —A—W, which comprises a silyl group W and a divalent linking group A which is attached by an Si—C bonds to group W and to a silicon atom of the siloxane oligomer. There must be an average of at least one B group per oligomer molecule, which preferably is internal (i.e. non-terminal) to the oligomer. More preferably, there are at least two B groups per oligomer molecule. Usually, if a B group is attached to a silicon atom of the siloxane backbone, the other R group(s) on that silicon atom is an alkoxy group.

In the structure B, the divalent linking group A creates a non-siloxane bridge between the siloxane oligomer and the silyl group. The linking group A may contain heteroatoms in the structure so long as Si—C bonds are used at the ends of the linking group to form the respective connections to the oligomer and to the silyl group W. The linking group may be linear, branched or cyclic and may be olefinically or aromatically unsaturated. The linking group may be, for instance, alkylene, alkarylalkylene or alkarylene, or it may be alkylene which is interrupted by heteroatom-containing organic structures, such as ether, polyether, ester, polyester, carbamate, polyurethane, isocyanurate, thioether, disulfide, tetrasulfide, or the like. Preferably, the linking group is an alkylene of 2 to 12 carbon atoms. The linking group A may be substituted with silyl or siloxy functions, as well as unsaturated groups. Indeed, group A may form part of a backbone with relatively linear siloxane chains attached to either end of the group. Examples of linking groups A include cycloaliphatic groups, such as 1,4-diethylenecyclohexylene:

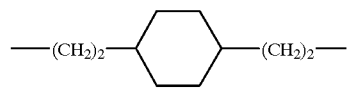

or 1,3,-diethylene-5-triethoxysilylethylcyclohexylene:

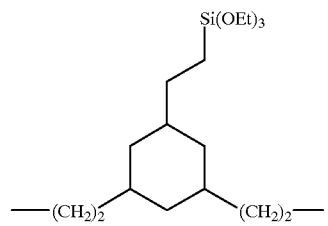

branched or linear aliphatic groups, such as ethylene, 1,2-propylene, 1,3-propylene, 1,4-butylene, 1,3-butylene, 1,2-butylene or 2,2-dimethyl-1,3-propylene; arylene groups, such as 1,4-phenylene; alkarylalkylene groups, such as 1,4-diethylenephenylene:

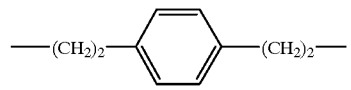

divalent polyether groups of the formula:

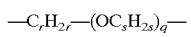

where q is 1–50, preferably 1–5; r and s are integers of 2–6; and divalent thioether or polysulfide-containing groups of the formula:

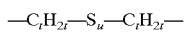

where t is 2–16, preferably 2–4, and u is 1–8, preferably 2–4. Preferably, the linking group is alkylene of 2 to 12 carbon atoms, more preferably 2–3 carbon atoms. having hydrolyzable functionality, such as alkoxy or acetoxy functionality. Alternatively, the group W may be a silicon linked organosiloxane or polyorganosiloxane group. Preferably, the silyl group W is an alkoxysilyl group or a further siloxane oligomer of alkoxy silane monomers, more preferably a dialkoxysilyl and most preferably a trialkoxysilyl group.

A preferred B group may be represented as —$C_fH_{2f}$—$SiR^1_g(X)_{3-g}$ wherein the structure —$C_fH_{2f}$— corresponds to A and the structure —$SiR^2_g(X)_{3-g}$ corresponds to W. Suitably, f=2 to 12, g=0 to 2, X is a hydrolyzable group such as halogen, oxime, alkoxy, aryloxy, alkenoxy or acetoxy and $R^1$ is as previously defined. More preferably f=2 to 6, g=0–1, X is methoxy, ethoxy or acetoxy, and $R^1$ is methyl. Exemplary B groups s are —$C_2H_4Si(OCH_3)_3$; —$C_2H_4Si(OC_2H_5)_3$; —$C_2H_4Si(OCH_3)_2(CH_3)$; —$C_2H_4Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; and —$C_2H_4Si(OCH_3)_2(OSi(OCH_3)_3)$.

$R^1$ is a saturated or aromatic hydrocarbon of 1 to 16 carbon atoms, e.g., alkyl (linear or branched), cycloalkyl, aryl or alkaryl. Exemplary $R^1$ groups are methyl, ethyl, i-propyl, i-butyl, t-butyl, pentyl, cyclohexyl, octyl, decyl, dodecyl, phenyl, benzyl or napthyl. Methyl and ethyl are preferred $R^1$ groups.

$R^2$ is a group as defined for $R^1$ or an acyl group. Examples of acyl groups include acetyl, benzoyl and propionyl. Preferably $R^2$ is methyl or ethyl, although if a non-volatilizing oligomer is desired some of the $R^2$ groups may suitably be dodecyl.

$R^3$ is a monovalent organic group containing an aliphatically unsaturated hydrocarbon group. $R^3$ may contain ethylenic or acetylenic unsaturation. Examples of $R^3$ groups include vinyl, allyl, propargyl, acryloxyalkyl, methacryloxyalkyl, crotyloxyalkyl, styryl, n-octenyl, linolyl, lineoyl, etc. Vinyl, acryloxypropyl and methacryloxypropyl are preferred. Usually where a silicon atom has a $R^3$ group, the other R group(s) on that silicon atom will be an —$OR^2$ group, preferably alkoxy.

The R groups on the oligomer may also include one or more $R^4$ groups. $R^4$ is a monovalent organic radical linked to the Si atom of the siloxane oligomer backbone by an Si—C bond, which does not include an aliphatically unsaturated hydrocarbon group and which has one or more ether, polyether, ester, polyester, carbamate, polyurethane, isocyanurate, thioether, polysulfide, blocked mercaptan, amide, cyano or oximato group thereon. Polysulfide encompasses groups having the functionality —$S_n$— therein where n is 2–8, preferably 2–4, especially disulfide and tetrasulfide. Blocked mercaptans are functional groups produced by reaction of a mercapto group with a subsequently removable blocking agent. Exemplary blocked mercaptan groups include thioacetal, thiocarboxylate and other groups disclosed in copending application PCT\US98\17391, filed Aug. 21, 1998, designating U.S.

Preferably m+n+o+p≦45, more preferably <30 and most preferably <15. Preferably m is 2 to 4, n is to 1 to 15, o is 0 to 2 and p is 0 to 1, though it is understood there may be distributions of the number of siloxy units within a given oligomer batch.

Preferably there are multiple alkoxy groups available on the oligomer so that upon curing these oligomers may cross-link with each other and/or the inorganic filler, if present. Thus, R is —$OR^2$, more preferably ethoxy or methoxy, in at least one quarter of the R groups, more preferably in at least half of the R groups, while the remainder of the R groups are B or $R^3$ groups, more preferably, trialkoxysilylethyl groups, most preferably triethoxysilylethyl. Preferably, in such embodiments p=0, o=0, m=2 and n=2 to 20.

A preferred formula for the oligomer is

with R, $R^2$, m, n and o as above. Preferably $R^2$ is ethyl, o=0, m=2 and n=0 to 15. Most preferably, all R's are either B, —$OR^2$ or $R^3$, and the oligomer contains at least one B group and at least one $R^3$ group.

It is preferred that the oligomer has a viscosity of 0.5 to 500 csks or more preferably 0.5 to 200 csks (25° C.). As is clear to one of skill in the art, the viscosity of the oligomer may be adjusted by adjusting the number of siloxy groups in the oligomer. In most applications the viscosity will be adjusted for a specific application to ensure that the composition containing the oligomer will spread over a specific substrate or be sprayable.

Exemplary oligomers which may be used in the inventive formulations include the following structures in which a, b and c are respectively positive integers the sum of which is from 2 to 20, preferably 15 or less and u is 1–8, preferably 2 to 4.

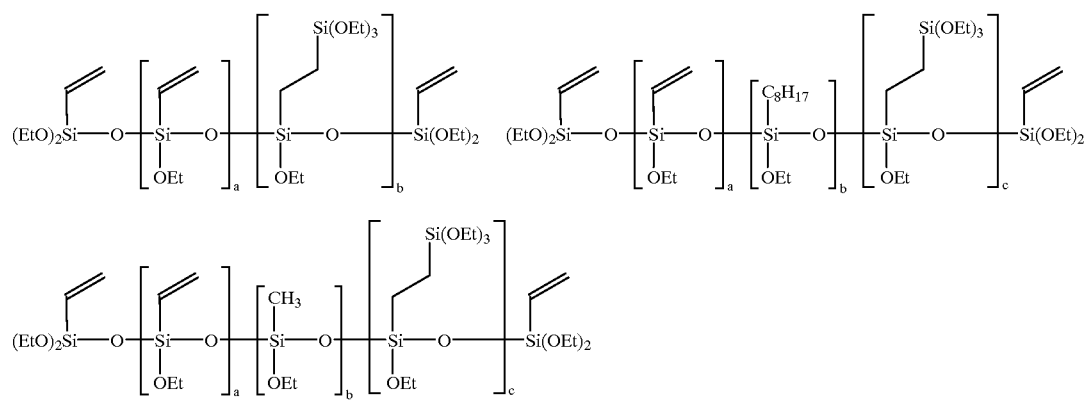

-continued
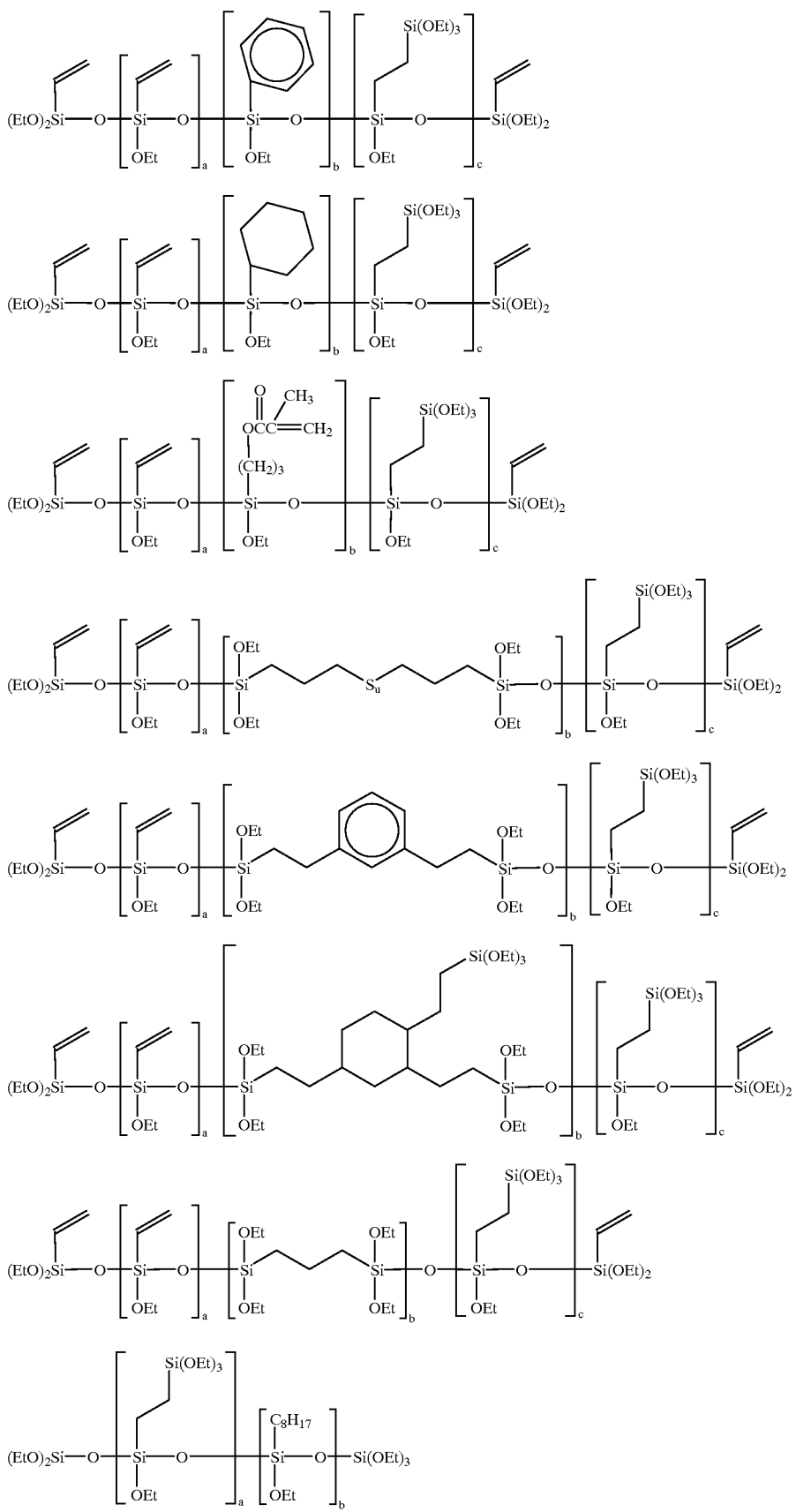

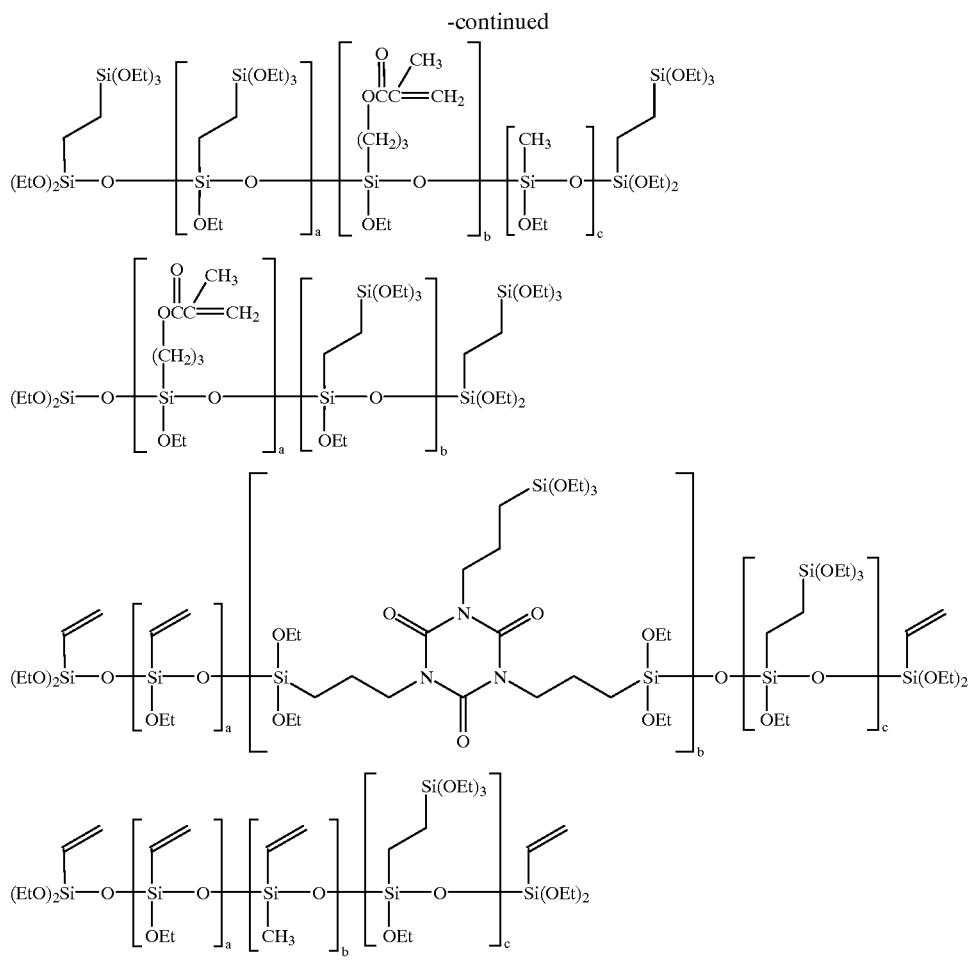

For lower molecular weight oligomers, volatility can be reduced significantly by providing alkoxy groups of high chain length, such as octyloxy or dodecyloxy. This can be accomplished by transesterifying readily available methoxy or ethoxy groups to a $C_8$ or higher alkoxy group, for instance an octyloxy or dodecyloxy group. The transesterified oligomers provide hydrophobicity in the filled elastomer compositions and are permanently bound to the polymer when the compound is crosslinked, usually with peroxides.

The low volatility ethylenically unsaturated siloxane oligomers described herein are suitable replacements for commercial cohydrolysis products of dimethyl and vinylmethylchlorosilanes. Using a process to make an oligomer starting with vinyl alkoxy silanes, optionally in combination with alkylalkoxy and/or tetraalkoxy silanes, reduces the cost of the oligomer. Unexpectedly, in wire and cable applications, the mechanical and wet electrical stability properties of the elastomer cable insulation compound made with the new oligomers are improved. For coatings, off-gassing of methanol or ethanol may be reduced or eliminated by use of low-volatility oligomers produced by transesterification as described above.

If coupling to filler is required for mechanical property improvement the lower alkoxy moieties are preferred. They may be attached to the backbone of the oligomer, or pendant if a subsequent hydrosilation process is employed to attach them to the vinyl groups. Oligomers which contain both lower and higher alkoxy groups, e.g. by partially transesterifying lower alkoxy groups, allow for fine tuning of hydrophobicity and filler coupling properties. Thus the synthesis processes employed lend to an unlimited number of structures within the overall scope of the invention.

Oligomer Manufacture

The oligomers may be formed in a two step process or one step process. In the two step process a condensation reaction is followed by a hydrosilation reaction. Such a two step process is obtained by producing (1) a siloxane oligomer with olefinically unsaturated (ethylenic or acetylenic) groups by condensation from an unsaturated alkoxy silane, and optionally, other alkoxy silanes; and (2) partially hydrosilylating the oligomer produced in step (1) with an alkoxyhydridosilane or siloxane. In the one step process bis-alkoxysilane(s), wherein the silane silicon atoms are bridged by a divalent linking group as described in the description of the group B above, are condensed, preferably with other alkoxy silanes, to form a siloxane oligomer.

The condensation may be performed according to any of the procedures disclosed in the previously identified patents, U.S. Pat. No. 4,950,779, Wengrovius, et al., U.S. Pat. No. 5,298,998, Horn, et al., and U.S. Pat. No. 5,210,168, Bergstrom, et al. In the two step process, the first starting material is either an olefinically unsaturated alkoxy silane or a hydrido alkoxy silane, which preferably are trialkoxysilanes. The alkoxy groups may be $C_1$–$C_{12}$, may be branched cyclic or include aryl groups, and may include hetero atoms. The preferred alkoxy groups are methoxy, ethoxy, isopropoxy, n-butoxy and cyclohexoxy. Examples of the unsaturated group may be vinyl, acryl, methacryl, acrylate, acetylenyl, or any 1,2 unsaturated olefin. There may be different such unsaturated groups within one oligomer.

The starting material for the one step process is a bis, tris, or higher alkoxysilane. Preferably a bis-dialkoxysilane or bis-trialkoxysilane is the starting material. Exemplary such silanes are 1,4-bis-(triethoxysilylethyl)cyclohexane; 1,3,5-tris-(triethoxysilylethyl)cyclohexane; and 1,4-bis-(triethoxysilyl)butane.

During condensation, other optional alkoxy or acyloxy silanes may be incorporated into the oligomer including, but not limited to, aryl silanes, alkyl silanes, carbamato silanes, cyano silanes, polyalkylene oxide silanes, ester silanes, or isocyanurate silanes. These silanes must have at least one alkoxy group or acyloxy (in which case they would form terminal units on the oligomer), but preferably are di- or tri-alkoxy silanes. Specific examples of these silanes include:

bis-(triethoxysilylethyl)benzene, tris-(2-triethoxysilylethyl)cyclohexane, and methyl N-(3-trimethoxysilylpropyl)carbamate. In the one step reaction the characteristic bridging structure in the oligomers of the invention is provided by use of the bis, tris or higher alkoxy silanes.

Moreover, in the condensation, dialkoxysiloxy units may be inserted into the oligomer to affect the cross-linking, surface active, and viscoelastic properties of the oligomer. Said insertion may be done by using tetraalkoxysilanes, such as tetramethoxysilane or tetraethoxysilane.

The condensation of the alkoxy silane monomers is suitably performed in the presence of a carboxylic acid (e.g., acetic or formic acid) or water. Alternatively, a strong condensation catalyst may be used, e.g., a strong acid or an acidic ion exchange resin such as AMBERLYST resin from Rohm & Haas Co. The other reaction conditions of the condensation will depend on the monomeric silanes; however, temperature ordinarily will be in the range of 20 to 60° C. Exemplarily reaction conditions may also be found in U.S. Pat. No. 4,950,779, Wengrovius, et al., U.S. Pat. No. 5,298,998, Horn, et al., and U.S. Pat. No. 5,210,168, Bergstrom, et al.

In the two step process the product of the condensation is a siloxane oligomer containing a plurality of unsaturated groups attached to silicon atoms on the siloxane oligomer backbone by Si—C bonds. The unsaturated functionalized siloxane oligomer produced in Step 1 is reacted with a hydrido silane in the presence of a known hydrosilation catalyst, for instance a platinum, palladium or rhodium based catalyst. Such hydrosilation, for example, may be accomplished according to U.S. Pat. Nos. 5,530,452 and 5,527,936, which are incorporated herein by reference. It is preferred that the hydrido silane be a silane having multiple hydrolyzable groups, such as a trialkoxysilane, to afford multiple cross-linkable sites on the resulting oligomer. During reaction, hydridosilane is reacted with unsaturated group (s) on the oligomer such that a bond is formed between the silicon atom and the unsaturated group (which, if ethylenic, is saturated in the process). A deficiency of the hydridosilane is used, relative to the number of unsaturated groups available on the oligomer so that at least about one unsaturated group per oligomer molecule remains after the hydrosilation. The unsaturated groups remaining on the oligomer after the hydrosilation allow the oligomer to become crosslinked with the organic polymer matrix during the subsequent cure reaction of the organic polymer/filler/coupling agent compositions of the invention.

The resulting oligomer is of the structure above.

Curable Polymer/Filler Compositions

The curable polymer/filler compositions of the present invention comprise: (1) a free-radically curable organic polymer, (2) an inorganic filler and (3) an oligomer as described above. The composition may also include a free-radical catalyst or generator. Typical organic polymers to which the present invention applies are curable elastomers such as any of the synthetic or natural rubbers with which fillers are conventionally employed. Examples include natural rubber, synthetic rubbers such as styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, polyisobutadiene rubbers, and any other vulcanizable or crosslinkable elastomeric material.

The organic fillers used in the curable compositions are known to those skilled in the art and include any suitable finely divided or particulate inorganic substance. At the time of incorporation into the curable composition, most fillers may be in the form of finely divided particles. They may be approximately isometric, having a maximum diameter, i.e., a maximum linear dimension of ten $\mu$m, preferably five $\mu$m; or they may be in the form of plates or needles (fibers) having a thickness or diameter of twenty $\mu$m or less, preferably five $\mu$m or less. Compositions containing larger particles may be usefully formulated but they tend to give poor properties. The minimum size of the filler particles is not critical, any of the conventionally used fillers being suitable in this respect. Among the specific fillers that may be used in the present invention are asbestos, ground glass, kaolin and other clay minerals, silica, calcium silicate, calcium carbonate (whiting), magnesium oxide, barium carbonate, barium sulfate (barytes), metal fibers and powders, glass fibers, refractory fibers, titanium dioxide, mica, talc, chopped glass, alumina, aluminatrihydrate, quartz, wollastonite (calcium silicate), and inorganic coloring pigments. Kaolin clay is a filler of choice in the wire and cable industry and therefore is preferred.

A heat activated free-radical catalyst or generator will typically be incorporated into the curable compositions of the invention. However, in some cases such a catalyst may not be required, for instance when the oligomer contains disulfide or polysulfide groups in the bridging structure A of group B, or when other sources of free radicals are used such as UV radiation. When a free-radical catalyst is employed it may be any known catalyst or vulcanizing agent compound, of which organic peroxides, azonitrile compounds (e.g. AIBN), and sulfur are examples. Metal drier compounds, such as fatty acid, octoate or naphthoate salts of zinc, calcium, cobalt, copper, molybdenum, manganese, chromium, or nickel, may also be used as cure catalysts. Preferred catalysts are organic peroxides. Any of the peroxides described or listed in Martens' U.S. Pat. No. 3,148,169 can be employed. The catalyst is one that is heat activated so that when a mixture of the organic elastomer and catalyst is heated to a given temperature or temperature range the crosslinking reaction takes place.

Any other additives conventionally employed in free-radically curable polymer/filler to the curable composition can be used. For example, stabilizers and antioxidants, cure boosters, cure activators, cure accelerators, crosslinkers, waxes, oils, wet electrical stabilizers, and plasticizers can be added. Additional pigmentation can be provided and any other additive for providing or modifying other properties can be used. Other silane crosslinkers, such as vinyltrimethoxysilane or (meth)acryloxytrimethoxysilane, may also be included in the composition, or such silanes may incorporated into the organic polymer backbone by copolymerization.

The proportions of components in the curable composition are not narrowly critical and conventionally are based on weight parts per 100 wt. parts of organic elastomer. On this basis the inorganic filler can be varied from 25 to 200, preferably 50 to 150, wt. parts per 100 wt. parts of elastomer. The coupling composition can be present in an amount ranging from 0.1 to 10, preferably from 0.5 to 3 weight parts per 100 wt. parts of filler and the peroxide or other radical catalyst can be used in amounts of 0.5 to 10 wt. parts, preferably 2 to 5 wt. parts per 100 wt. parts of elastomer.

The curable compositions, except for the catalyst component, are conventionally prepared in a BANBURY mixer (Farrel Co.) or any other intensive mixer. Accepted rubber industry compounding techniques may be used. The catalyst, if employed, may be added in the BANBURY mixer or by transferring the resulting compound to a roll mill wherein it is rolled and the peroxide is added and mixed into the compound. Either way, the result is a curable composition, which then can be used to coat electrical conductors for the purpose of insulating same after curing. These compositions can also be used for a variety of other applications where low water pickup is desirable, for instance, encapsulating electrical components and other electrical insulation applications, gaskets, seals, pump diaphragms, automotive ignition wires, sulfur cured rubbers, etc. Wire and cable insulations are preferred uses for the filled compositions of the invention.

In order to cure the curable compositions it is only necessary to apply heat above the temperature at which the catalyst becomes activated. Preferably a peroxide is chosen for use having a decomposition temperature in excess of 200° F. (93° C.), preferably in excess of 250° F. (121° C.). In producing insulated wire cable the curable composition, in heated readily deformable condition (but below the decomposition temperature of the catalyst), is applied through an extruder to a conductor to form an insulating coating around the conductor. After extrusion onto the conductor the combined conductor and coating of curable composition is passed into an oven or autoclave where the temperature is raised to a point above the decomposition temperature of the peroxide upon which the curable composition crosslinks to form a tough cured thermoset insulating coating around the conductor.

Other Curable Compositions

These oligomers of formula (1) above, are also useful in coatings or adhesive formulations, as crosslinkers, adhesion promoters, to provide a dual radical/moisture cure mechanism, and/or to provide moisture resistance in the cured coating. The oligomers may be used as reactive diluents, in that they have little volatility, provide little or no contribution to volatile organic compounds (VOCs) and have an adjustable viscosity to match an application, or to dilute another composition to make the entire composition spreadable or sprayable. For such applications oligomers in which $R^3$ comprises an acrylate or methacrylate group are preferred.

The oligomers may be used in masonry waterproofing, paints, corrosion protection systems, and on substrates such as cement, metal, polymers (PVC, PVS, EPDM, PE, PP, ABS, EPR, BR, silicone, polycarbonate, etc.), wood, a paint layer (as a primer) or rubber. Moreover, oligomers may be used in silicate hardcoats.

The oligomers may be used by themselves or with other monomers. Because the oligomers are unsaturated, they may be copolymerized with other unsaturated monomers. Specifically the oligomers are useful in the automotive clearcoats which may be made per U.S. Pat. No. 5,244,696 to Hazan et al., incorporated herein by reference. Clearcoats made with the present oligomer have good mar resistance, good gloss (and gloss retention), chemical resistance, distinctiveness of image (DOI), and stain resistance.

Coating compositions incorporating the oligomers of this invention can include a number of ingredients to enhance preparation of the composition as well as to improve final properties of the coating composition and the finish. For example, it is often desirable to include about 20 to 90%, preferably 20 to 60%, by weight of the composition, of a film-forming reactive silane polymer. Such polymer typically has number average molecular weight of about 500 to 10,000.

The silane polymer is the polymerization product of about 30–95%, preferably 40–60%, by weight of ethylenically unsaturated nonsilane-containing monomers and about 5–70%, preferably 10–60%, by weight of ethylenically unsaturated silane-containing monomers, based on the weight of the organosilane polymer. Suitable ethylenically unsaturated nonsilane-containing monomers are alkyl acrylates, alkyl methacrylates and mixtures thereof, where the alkyl groups have 1–12 carbon atoms, preferably 3–8 carbon atoms.

The film-forming component of the coating composition is referred to as the binder and is dissolved, emulsified or otherwise dispersed in an organic solvent or liquid carrier. The binder generally includes all the components that contribute to the solid organic portion of the cured composition. Generally, pigments, and chemical additives such as stabilizers are not considered part of the binder. Non-binder solids other than pigments typically do not exceed about 5% by weight of the composition. The term binder includes the oligomer of the present invention, the organosilane polymer, the dispersed polymer, and all other optional film-forming components. The coating composition may contain about 50–100% by weight of the binder and about 0–50% by weight of the organic solvent carrier.

Suitable alkyl methacrylate monomers used to form the silane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like.

Cycloaliphatic methacrylates and acrylates also can be used, such as trimethylcyclohlexyl methacrylate, trimethylcyclohexyl acrylate, iso-butyl cyclohexyl methacrylate, t-butyl cyclohexyl acrylate, and t-butyl cyclohexyl methacrylate. Aryl acrylate and aryl methacrylate also can be used, such as benzyl acrylate and benzyl methacrylate. Mixtures of two or more of the above-mentioned monomers are also suitable.

In addition to alkyl acrylates and methacrylates, other polymerizable nonsilane-containing monomers, up to about 50% by weight of the polymer, can be used in the silane modified acrylic polymer for the purpose of achieving the desired properties such as hardness; appearance; mar, etch and scratch resistance, and the like. Exemplary of such other monomers are styrene, methyl styrene, acrylamide, acrylonitrile, methacrylonitrile, hydroxyethyl acrylate, methacrylic acid and the like.

The oligomers may also be employed in curable compositions comprising ethylenically unsaturated monomers or prepolymers and a free-radical catalyst. Such compositions include UV or EB curable adhesives and coatings, resins and gel-coats formulated from unsaturated polyesters, anaerobically curable adhesives, acrylic engineering adhesives based on polymer-in-monomer syrups, and the like. The oligomer may be employed at levels of from about 0.5 to about 99% of such compositions, preferably about 1 to about 50%, depending on the properties desired to be obtained or modified in the cured formulations.

The adhesive and coating compositions of the invention also will typically include a free-radical catalyst, although this is not always necessary, for instance, in formulations designed for EB curing, or where the oligomer contains a polysulfide group in the bridge group B or in an $R^4$ group. The free radical catalyst may be any of the heat activatable catalysts described above or a free radical photoinitiator. Examples of free radical photoinitiators include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphonates, ketosulfides, dibenzoyldisulphides, diphenyldithiocarbonate, and diphenyl(2,4,6-trimethylbenzoyl) phosphine oxide. Typically, the photoinitiator will be employed in an amount of 0.1 to 10%, preferably 0.5 to 5% by weight of the composition.

The adhesive or coating compositions of the invention may also include any other component conventional for the type of formulation into which the oligomer is incorporated.

The invention is illustrated by the following non-limiting examples, wherein parts and percentages are on a weight basis unless otherwise stated.

EXAMPLES

Examples for Preparing the Silane Oligomers

Example 1

To 142.7 g (0.75 mole) of vinyltriethoxysilane and 52.1 g (0.25 mole) of tetraethoxysilane in a 500 ml. three-necked flask was quickly added 41.4 g (0.9 mole) 96% formic acid at room temperature. The flask was protected with nitrogen and over 3 hours with heating, a combination of ethyl formate, ethanol and unreacted vinyltriethoxysilane (a total of 102.9 g) were distilled from the reaction mixture, producing 128.1 g of vinyl-containing ethoxysiliconate oligomer of 0.5 cstks viscosity.

The above reaction mixture was heated to 120° C. and 0.11 g of platinum-divinyltetramethyldisiloxane complex, containing 1.9% Pt, (Karstedt's catalyst; see U.S. Pat. No. 3,775,452) was added. From an addition funnel, 12.3 g (0.074 mole) of triethoxysilane was added over 30 min., maintaining the addition rate to sustain a reaction temperature of 120–125° C. After the addition was complete, the flask was maintained at 125–130° C., whereupon a small amount of black precipitate (platinum metal) formed. The product was cooled and filtered to produce 139.5 g of a clear, almost colorless liquid of 1–2 cstks. viscosity.

Example 2

In a manner similar to Example 1, a mixture of 142.7 g (0.75 mole) of vinyltriethoxysilane and 44.6 g (0.25 mole) of methyltriethoxysilane were allowed to react with 41.4 g (0.9 mole) 96% formic acid, and with heating, 120.9 g of ethanol, ethyl formate and unreacted methyltriethoxysilane and vinyltriethoxysilane were distilled from the reaction mixture. The resulting 120.9 g of vinyl siliconate oligomer was hydrosilylated with 12.3 g (0.074 mole) of triethoxysilane in the presence of 0.11 g Karstedt's catalyst (as above). The final product, 131.3 g, was clear and colorless after filtration, and 1–2 cstks. viscosity.

Example 3

In a manner similar to Example 1, a mixture of 171.3 g (0.9 mole) of vinyltriethoxysilane and 17.8 g (0.1 mole) of methyltriethoxysilane were allowed to react with 41.4 g (0.9 mole) 96% formic acid, and with heating, 101.2 g of ethanol, ethyl formate and unreacted methyltriethoxysilane and vinyltriethoxysilane were distilled from the reaction mixture. The resulting 126.4 g of vinyl siliconate oligomer was hydrosilylated with 14.3 g (0.087 mole) of triethoxysilane in the presence of 0.11 g Karstedt's catalyst (as in example 1). The final product, 140.1 g, was clear and colorless after filtration, and 1–2 cstks. viscosity.

Example 4

Following the procedure of Example 1, a mixture of 171.3 g (0.9 mole) of vinyltriethoxysilane and 27.7 g (0.1 mole) of octyltriethoxysilane were allowed to react with 41.4 g (0.9 mole) 96% formic acid, and with heating, 103.7 g of ethanol, ethyl formate and unreacted vinyltriethoxysilane were distilled from the reaction mixture. The resulting 137.9 g of vinyl siliconate oligomer was hydrosilylated with 14.8 g (0.09 mole) of triethoxysilane in the presence of 0.11 g Karstedt's catalyst (as in Example 1). The final product, 150.9 g, was clear and colorless after filtration, and 3–4 cstks. viscosity.

Example 5

Into a 500 ml. three-necked flask was added 177.3 g (0.5 mole) of 1,2-bistriethoxysilylethane, 95.2 g (0.5 mole) of vinyltriethoxysilane, and 34.5 g (0.75 mole) of 96% formic acid. The reaction mixture was heated to reflux temperature and held at reflux for 1 hour. The volatile components (ethanol and ethyl formate) were then distilled from the reaction mixture (80.2 g) yielding 110.9 g of vinyl siliconate after filtration. The viscosity was 4–5 cstks.

Example 6

Following the procedure set forth in Example 5, 237.9 g (0.5 mole) of bis(3-triethoxysilylpropyl) disulfide, 95.2 g (0.5 mole) of vinyltriethoxysilane, and 34.5 g (0.75 mole) of 96% formic acid were allowed to react. The reaction mixture was heated to reflux temperature and held at reflux for 1 hour, followed by distillation of 76.8 g of ethyl formate and ethanol. The resulting yellow product was filtered, producing 295.5 g of material with a viscosity of 1–2 cstks.

Example 7

To 1,142.4 g (6.0 moles) of vinyltriethoxysilane in a two liter three-necked flask was added 5.6 g (0.5 wt. %) of PUROLITE CT-175 sulfonic acid ion exchange resin and 81.0 g (4.5 moles) water. The flask was heated to 80–100° C. with stirring and maintained at this temperature for one hour. Under reduced pressure, 424.6 g of a combination of ethanol and a small amount (about 18 g) of unreacted vinyltriethoxysilane was distilled from the mixture. After cooling, the flask contents were filtered, producing 775.1 g of clear, colorless vinyl siliconate oligomer of about 1 cstk. viscosity and containing approximately 11.0 moles of ethoxy groups attached to silicon per kilogram.

Example 8

To 200.0 g of the oligomer of Example 7 (containing approx. 2.2 moles of ethoxy groups) in a 1000 ml. three-necked flask was added 149.0 g (0.8 mole) dodecanol and 0.35 g (0.1 wt. %) of tetraisopropyl titanate catalyst. With stirring the flask contents were heated to 130–140° C., removing 31.2 g of ethanol by distillation. The flask was cooled to 50° C. and 9.4 additional grams of ethanol were distilled under reduced pressure (3 mm Hg). The flask contents were filtered, yielding 305.6 g clear colorless product of 5 cstks. viscosity.

Example 9

To 200.0 g of the oligomer of Example 7 (containing approx. 2.2 moles of ethoxy groups) in a 1000 ml. three-necked flask was added 298.0 g (1.6 moles) dodecanol and 0.5 g (0.1 wt. %) of tetraisopropyl titanate catalyst. With stirring the flask contents were heated to 125–135° C., removing 60.4 g ethanol by distillation. The flask was cooled to 50° C. and 14 additional grams of ethanol were distilled under reduced pressure (3 mm Hg). The flask contents were filtered, yielding 423.7.0 g clear light yellow product of 14 cstks. viscosity.

compound and cured for 25 minutes at 171° C. The test plaques for each compound were tested for mechanical properties and electrical properties as set forth in Table 1.

The formulations used Table 1 were prepared by incorporating the silanes or oligomers shown in Table 1 into a base formulation as follows, where quantities are given in parts by weight:

| | |
|---|---|
| 100 | NORDEL 2722P EPDM (DuPont) |
| 1.5 | AGERITE Resin D antioxidant (Vanderbilt) |
| 5 | zinc oxide (Zinc Corp.) |
| 5 | paraffin wax (International Wax) |
| 5 | ERD 90 red lead dispersion (Rhein-Chemie) |
| 2.6 | DICUP R peroxide (Hercules) |

A clay component was also included in the formulation.

In Table 1, A-1751 is a state of the art commercial oligomer sold by Witco Corp. as a coupling agent for curable filled elastomer formulations for wire and cable insulation applications, and provided as a comparative example, together with the "none" entry.

TABLE 1

| Oligomer | None | A-1751 | Example 5 | | Example 6 | Example 1 | Example 4 | Example 2 | Example 3 | Example 9 |
|---|---|---|---|---|---|---|---|---|---|---|
| Physical Properties, cured 20 minutes @ 171° C. | | | | | | | | | | |
| Hardness, Shore A | 84 | 84 | | | 87 | 87 | 86 | 88 | 87 | 88 | 86 |
| Elongation, % | 520 | 420 | | | 370 | 400 | 350 | 340 | 350 | 310 | 380 |
| 100% Modulus, psi. | 620 | 850 | | | 780 | 790 | 830 | 810 | 850 | 840 | 780 |
| 200% Modulus, psi. | 750 | 1210 | | | 1260 | 1180 | 1340 | 1330 | 1370 | 1390 | 1270 |
| 300% Modulus, psi. | 870 | 1430 | | | 1470 | 1410 | 1660 | 1650 | 1680 | 1720 | 1550 |
| Tensile, psi. | 2190 | 1750 | | | 1620 | 1600 | 1710 | 1740 | 1760 | 1750 | 1710 |
| Specific Inductive Capacity @ 60 HZ | | | | | | | | | | |
| As cured | 2.48 | 2.26 | As cured | | 2.56 | 2.45 | 2.54 | 2.41 | 2.43 | 2.31 | 2.55 |
| 3 days in 90° C. water | 3.09 | 2.59 | 17 Days in 90° C. water | | 2.62 | 2.43 | 2.58 | 2.44 | 2.44 | 2.31 | 2.57 |
| 14 days in 90° C. water | 3.27 | 2.63 | 34 Days in 90° C. water | | 2.65 | 2.48 | 2.60 | 2.45 | 2.46 | 2.28 | 2.58 |
| 28 days in 90° C. Water | 3.23 | 2.64 | | | | | | | | |
| 55 days in 90° C. water | 3.16 | 2.65 | | | | | | | | |
| 83 days in 90° C. water | 3.09 | 2.65 | | | | | | | | |
| Power Factor @ 60 HZ | | | | | | | | | | |
| As cured | 0.0022 | 0.0015 | As cured | | 0.0014 | 0.0014 | 0.0013 | 0.0011 | 0.0015 | 0.0015 | 0.0013 |
| 3 days in 90° C. water | 0.045 | 0.0024 | 17 Days in 90° C. water | | 0.0061 | 0.0025 | 0.0031 | 0.0018 | 0.0021 | 0.0021 | 0.0032 |
| 14 days in 90° C. water | 0.045 | 0.0024 | 34 Days in 90° C. water | | 0.0066 | 0.0031 | 0.0033 | 0.0021 | 0.0025 | 0.0023 | 0.0034 |
| 28 days in 90° C. water | 0.050 | 0.0028 | | | | | | | | |
| 55 days in 90° C. water | 0.053 | 0.0033 | | | | | | | | |
| 83 days in 90° C. water | 0.051 | 0.0051 | | | | | | | | |

Composition Examples

The compositions described below were each prepared in the following manner. In a "B" BANBURY® mixer, using full cooling water, add EPDM polymer. Ram down mix (RDM) 30 secs. at 116 RPM. Add clay and silane, RDM 30 secs. Add rest of ingredients, except for the peroxide, RDM 30 secs. Dust down, RDM 20 secs. Dust down, RDM at 155 RPM until 149° C. is reached. Dump the mixer contents and sheet off on a 5×30 cm roll mill using a roll temperature of 80–85° C.

The resulting products were catalyzed by adding the peroxide on the roll mill at 80–85° C. and then cooled to room temperature. Test plaques were made from each rubber The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A free radically curable composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

19 wherein
each R is selected individually from the group consisting of B, $R^1$, $-OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are $-OR^2$, and at least one silicon atom of the oligomer has an $R^3$ group thereon; m=2 to 10; n=0 to 20; o=0 to 20; and p=0 to 10.

2. A composition as in claim 1 wherein B is a group of the formula:

$$-C_fH_{2f}-SiR^1{}_g(X)_{3-g}$$

where f is 2 to 12, g is 0 to 2, X is a hydrolyzable group, and $R^1$ is independently a saturated or aromatic hydrocarbon group of 1 to 16 carbon atoms.

3. A free radically curable composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

wherein
each R is selected individually from the group consisting of B, $R^1$, $-OR^2$, $R^3$ and $R^4$; B is an organosilyl functional group bridged to the Si atom of the siloxane oligomer backbone by an Si—C bond; each $R^1$ is methyl; each $R^2$ is acetyl, methyl, ethyl, octyl, dodecyl or a mixture thereof; and each $R^3$ is vinyl, acryloxypropyl, methacryloxypropyl or a mixture thereof, and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are $-OR^2$, and at least one silicon atom of the oligomer has an $R^3$ group thereon; and m+n+o+p<30.

4. A free radically curable composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

wherein
each R is selected individually from the group consisting of B, $R^1$, $-OR^2$, $R^3$ and $R^4$; B is an organosilyl functional group bridged to the Si atom of the siloxane oligomer backbone by an Si—C bond; each $R^1$ is methyl; each $R^2$ is acetyl, methyl, ethyl, octyl, dodecyl or a mixture thereof; and each $R^3$ is vinyl, acryloxypropyl, methacryloxypropyl or a mixture

20 thereof, and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are $-OR^2$, and at least one silicon atom of the oligomer has an $R^3$ group thereon; m=2 to 4; n=1 to 15; o=0 to 2; and p=0 to 1.

5. A free radically curable composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

wherein
each R is selected individually from the group consisting of B, $R^1$, $-OR^2$, $R^3$ and $R^4$; B is $-C_2H_4Si(OCH_3)_3$, $-C_2H_4Si(OC_2H_5)_3$; $-C_2H_4Si(OCH_3)_2(CH_3)$, $-C_2H_4Si(OCH_3)_2Cl$, $-C_2H_4(C_6H_9)(C_2H_4Si(OCH_3)_3)_2$, $-C_2H_4(C_5H_8)C_2H_4Si(OC_2H_5)_3$, or $-C_2H_4Si(OCH_3)_2(OSi(OCH_3)_3)$;

each $R^1$ is independently a saturated or aromatic hydrocarbon group of 1 to 16 carbon atoms;

each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are $-OR^2$, and at least one silicon atom of the oligomer has an $R^3$ group thereon; m=2 to 10; n=0 to 20; o=0 to 20; and p=0 to 10.

6. A free radically curable composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

wherein
each R is selected individually from the group consisting of B, $R^1$, $-OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are $-OR^2$, and at least one silicon atom of the oligomer has an $R^3$ group thereon; m=2 to 10; n=0 to 20; o=0 to 20; and p=0 to 10; and a free-radical catalyst.

7. A composition as in claim 6 wherein said free-radical catalyst is selected from the group consisting of organic peroxides, azonitrile compounds, sulfur, metal drier compounds, and free-radical photoinitiators, and mixtures thereof.

8. A composition as in claim 6 further comprising an ethylenically unsaturated monomer.

9. A free radically curable composition comprising an oligomer of the formula:

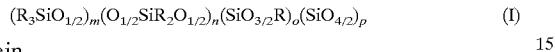

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10;

a radically curable organic polymer; and an inorganic filler.

10. A free radically curable composition comprising an oligomer of the formula:

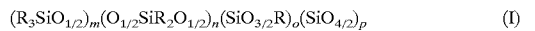

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10;

a radically curable organic polymer selected from the group consisting of natural rubber, styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, and polyisobutadiene rubbers; and an inorganic filler.

11. A free radically curable composition comprising an oligomer of the formula:

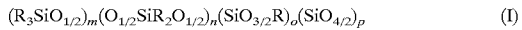

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10;

a radically curable organic polymer; and an inorganic filler selected from the group consisting of asbestos, ground glass, kaolin and other clay minerals, silica, calcium silicate, calcium carbonate (whiting), magnesium oxide, barium carbonate, barium sulfate (barytes), metal fibers and powders, glass fibers, refractory fibers, titanium dioxide, mica, talc, chopped glass, alumina, aluminatrihydrate, quartz, calcium silicate, and inorganic coloring pigments.

12. An oligomer of the formula:

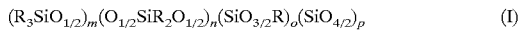

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, polyether, ester, polyester, carbamate, polyurethane, isocyanurate, thioether, polysulfide, blocked mercaptan, amide, cyano or oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10.

13. An oligomer as in claim 12 wherein the oligomer includes at least one $R^3$ group selected from the group consisting of acrylate and methacrylate.

14. An oligomer as in claim 12 wherein at least some of the $R^2$ groups are selected from the group consisting of octyl and dodecyl.

15. An oligomer as in claim 12 wherein m is 2 to 4, n is 1 to 15, o is 0 to 2 and p is 0 to 1.

16. An oligomer as in claim 12 wherein B is a group of the formula:

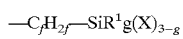

where f is 2 to 12, g is 0 to 2, X is a hydrolyzable group, and $R^1$ is independently a saturated or aromatic hydrocarbon group of 1 to 16 carbon atoms.

17. An oligomer as in claim 12 wherein B is selected from the group consisting of —$C_2H_4Si(OCH_3)_3$; —$C_2H_4Si(OC_2H_5)_3$; —$C_2H_4Si(OCH_3)_2(CH_3)$; —$C_2H_4Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; and —$C_2H_4Si(OCH_3)_2(OSi(OCH_3)_3)$.

18. An oligomer as in claim 12 selected from the group consisting of:

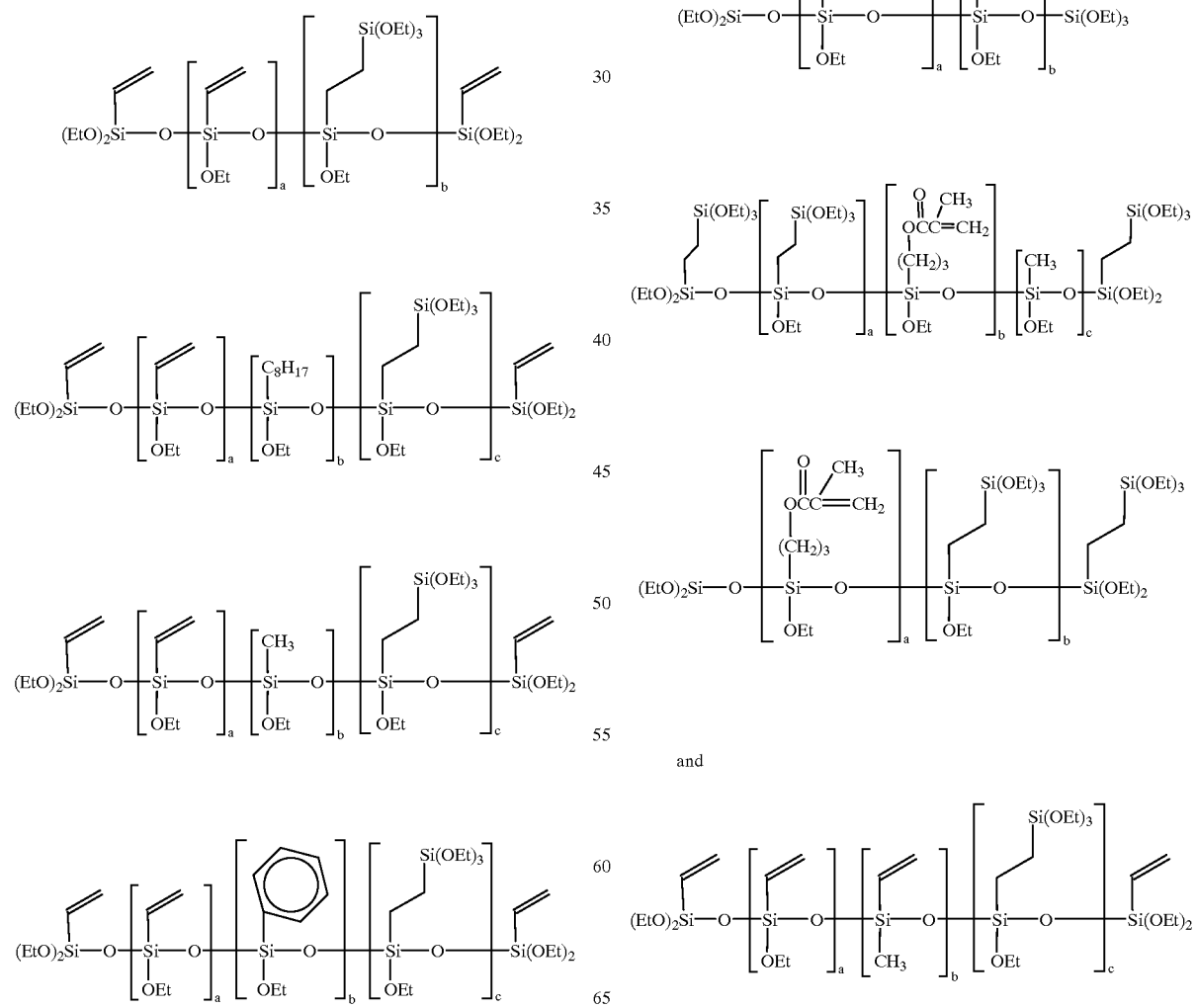

wherein a, b and c are respectively positive integers the sum of which is from 2 to 20.

19. An oligomer selected from the group consisting of:

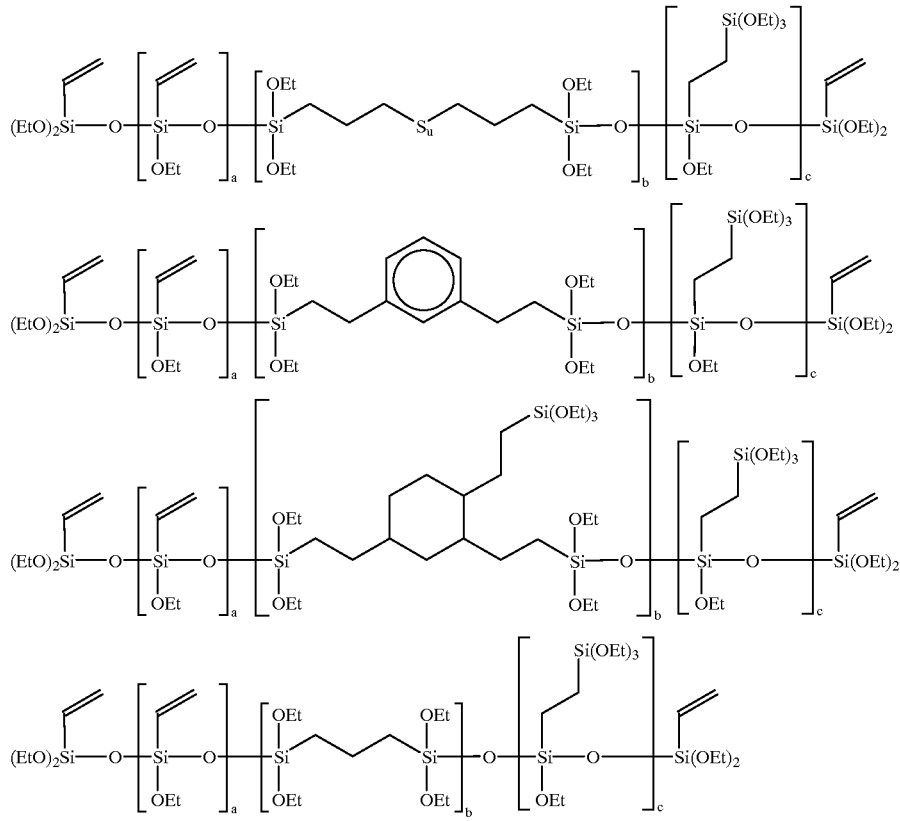

and

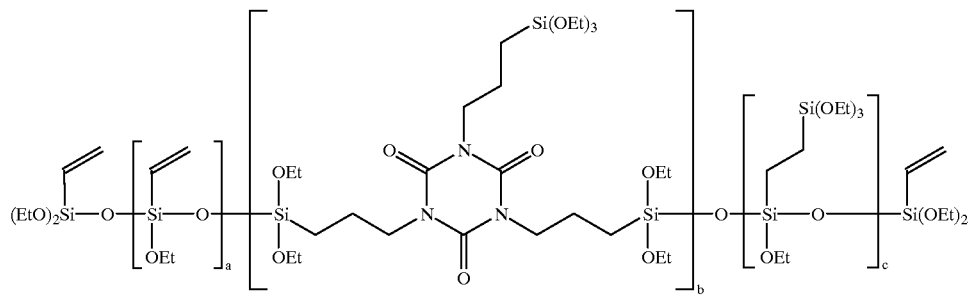

wherein a, b and c are respectively positive integers the sum of which is from 2 to 20 and u is 1–8.

20. An article, at least a portion of, which comprises a cured composition comprising an oligomer of the formula:

$$(R_3SiO_{1/2})_m(O_{1/2}SiR_2O_{1/2})_n(SiO_{3/2}R)_o(SiO_{4/2})_p \qquad (I)$$

wherein
each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from ether, ester, polyester, carbamate, polyurethane, isocyanurate, thioether, polysulfide, blocked mercaptan, amide, cyano or oximato groups; with the provisos that at least one R is a B, at least one quarter of all R groups are —$OR^2$, and at least one silicon atom of the oligomer has an $R^3$ group thereon;

m=2 to 10; n=0 to 20; o=0 to 20; and p=0 to 10;

a radically curable organic polymer; and an inorganic filler.

* * * * *